US010843516B2

(12) United States Patent
Becker et al.

(10) Patent No.: US 10,843,516 B2
(45) Date of Patent: Nov. 24, 2020

(54) WHEEL SUSPENSION FOR THE REAR AXLE OF A VEHICLE

(71) Applicant: Dr. Ing. h.c. F. Porsche Aktiengesellschaft, Stuttgart (DE)

(72) Inventors: Andreas Becker, Winnenden (DE); Norbert Schote, Ammerbuch (DE); Milos Vrba, Prague (CZ)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 171 days.

(21) Appl. No.: 16/011,940

(22) Filed: Jun. 19, 2018

(65) Prior Publication Data

US 2018/0370310 A1    Dec. 27, 2018

(30) Foreign Application Priority Data

Jun. 21, 2017    (DE) .......................... 10 2017 113 708

(51) Int. Cl.
*B60G 3/20*         (2006.01)

(52) U.S. Cl.
CPC .......... *B60G 3/20* (2013.01); *B60G 2200/182* (2013.01); *B60G 2200/44* (2013.01); *B60G 2204/143* (2013.01); *B60G 2204/148* (2013.01); *B60G 2204/418* (2013.01)

(58) Field of Classification Search
CPC ............... B60G 3/20; B60G 2200/182; B60G 2200/44; B60G 2204/143; B60G 2204/148; B60G 2204/418
See application file for complete search history.

(56) References Cited

U.S. PATENT DOCUMENTS

| | | | | |
|---|---|---|---|---|
| 4,202,563 A * | 5/1980 | Tattermusch | ............ | B60G 3/20 280/124.138 |
| 7,959,170 B2 * | 6/2011 | Mauz | ....................... | B60G 3/20 280/124.109 |
| 8,286,979 B2 * | 10/2012 | Schote | ..................... | B60G 3/20 280/124.1 |
| 9,707,813 B2 * | 7/2017 | Randle | ................... | B62D 17/00 |
| 9,902,226 B2 * | 2/2018 | Mohrlock | ............. | B60G 7/001 |

FOREIGN PATENT DOCUMENTS

| | | | | |
|---|---|---|---|---|
| DE | 102014112455 A1 * | 3/2016 | ............. | D06C 15/02 |
| EP | 1213162 A1 * | 6/2002 | ............. | B60G 3/265 |

OTHER PUBLICATIONS

DE102014112455A1 translation (Year: 2016).*

* cited by examiner

*Primary Examiner* — Faye M Fleming
(74) *Attorney, Agent, or Firm* — RatnerPrestia

(57) ABSTRACT

A wheel suspension for the rear axle of a vehicle includes a wheel carrier for fastening a rear wheel. A link system, which includes at least two links for fastening to a body of the vehicle, is fastened to the wheel carrier. One of the at least two links is a combination link with a basic body and two link portions for fastening at two positions of the body of the vehicle.

8 Claims, 5 Drawing Sheets

WHEEL SUSPENSION FOR THE REAR AXLE OF A VEHICLE

CROSS-REFERENCE TO RELATED APPLICATION

This application claims priority to German Patent Application No. DE 10 2017 113 708.4, filed Jun. 21, 2017, which is incorporated by reference herein in its entirety.

FIELD OF THE INVENTION

The present invention relates to a wheel suspension for the rear axle of a vehicle and to a rear axle of a vehicle having at least two such wheel suspensions.

BACKGROUND OF THE INVENTION

It is known that wheel suspensions are used for the rear axles of vehicles in order to fasten rear wheels in a rotatory manner to said wheel suspensions. The known wheel suspensions are conventionally equipped with a link system in order to be able to ensure transmission of force between the wheel carrier, on the one hand, and the body of the vehicle, on the other hand. The different links permit a relative movement of the wheel carrier with respect to the vehicle body in order in particular to be able to permit spring and damping movements of the wheel carrier. Furthermore, in the case of steered rear axles for wheel suspensions, additional freedoms of movement for the steering movement are to be provided by means of the link system.

In the known solutions of link systems, it is disadvantageous that a multiplicity of links designed in a complex manner and with complicated geometry customarily have to be provided. The individual links have to be coordinated here in a manner dependent on one another and with one another in order to be able to provide the individual possibilities of movement in the desired manner or to be able to predetermine same in the form of degrees of freedom. At the same time, care has to be taken to ensure a high degree of stability and a high level of comfort so that said steering systems can have a positive influence on the driving performance of the vehicle. Accordingly, this leads to a high degree of complexity of the entire steering system and therefore of the wheel suspension, and to a correspondingly large construction and high weight. The outlay on manufacturing known wheel suspensions is also relatively high both in respect of the manufacturing of the individual links and also in respect of the installation of the individual links for the link system.

SUMMARY OF THE INVENTION

It would be desirable to at least partially eliminate the disadvantages described above. In particular, it would be desirable to reduce the size of the wheel suspension and/or to improve the stability or the operation of the wheel suspension in a cost-effective and simple manner.

A wheel suspension according to aspects of the invention for a rear axle of a vehicle has a wheel carrier for fastening a rear wheel. A link system consisting of at least two links for fastening to a body of the vehicle is fastened to the wheel carrier. A wheel suspension according to aspects of the invention is distinguished in that one of the at least two links is designed as a combination link with a basic body and two link portions for fastening at two positions of the body of the vehicle.

According to aspects of the invention, the complexity of the link system is therefore now reduced by the fact that at least one link in the form of a combination link combines the function of two separate links which were hitherto conventional. Each of the link portions of the combination link can replace a link previously formed individually and separately. For example, a coupling link and a spring link can be combined in a combination link. The combination link then has a first link portion which can also be referred to as a spring link portion. The other link portion of the combination link can be designed as a coupling link and can therefore also be referred to as a coupling link portion.

By means of the combination of at least two separate links in a single component of the basic body of the combination link with the two link portions, the complexity of the entire system of the link system can be significantly reduced. In particular, the number of components is reduced. The manufacturing depth is also reduced since one component fewer in total has to be produced for the link system. Not least, the outlay on installation is also reduced since an additional component in the form of a further link can likewise be omitted in the installation. It is likewise of advantage that the stability of the entire system of the wheel suspension and in particular of the steering system can be improved since a relative movement of the two link portions with respect to each other is then no longer possible. On the contrary, by means of the fixed correlation of the two link portions in a common basic body of the combination link, the mechanical stability of said two links relative to each other is significantly improved or even maximized. The overall stability of the link system is therefore likewise improved.

The two link portions preferably extend in different directions in order to be able to provide different force transmission paths between the wheel carrier, on the one hand, and the vehicle body, on the other hand. Within the context of the present invention, a basic body here is in particular the integral or monolithic component (further explained later on) which has the two link portions of the combination link in an integral or monolithic construction. The combination link is preferably provided exclusively or substantially exclusively by means of the basic body.

By means of the reduction in the complexity of the link system, a significantly more compact construction of the entire wheel suspension is possible. This more compact construction is associated with improved stability because of the greater mechanical rigidity of the individual link portions of the combination link with respect to one another since they are now part of the same basic body.

It can be advantageous if, in the case of a wheel suspension according to aspects of the invention, the combination link is mounted on the wheel carrier via a first bearing device and via a second bearing device. In contrast to known solutions which customarily provide only a single bearing point between a link and the wheel carrier, the division of the mounting between a first and a second bearing device is now provided here. Owing to the fact that the combination link provides the functionality of two separate links by means of the two link portions, a higher proportion of force can accordingly also be transmitted via the combination link. The provision of the two bearing devices makes it possible for also said increased proportion of force to be able to be transmitted not only via the two link portions but also via the two bearing devices. Use is preferably made here of known bearing devices which can also be referred to as standard bearing devices. The two bearing devices are in particular provided here at a distance from each other, but are preferably arranged in a common or substantially in a common plane. Furthermore, the bearing devices are preferably provided or designed for providing a rotatory degree of freedom for a relative rotation of the combination link with respect to the wheel carrier and/or with respect to the vehicle body.

It is likewise advantageous if, in the case of a wheel suspension according to aspects of the invention, the first bearing device and the second bearing device have parallel, in particular coaxial bearing axes. Within the context of the present invention, a bearing axis of the respective bearing device should be understood as meaning the axis about which a relative movement of the individual mounted components with respect to each other, i.e. of the wheel carrier and of the combination link, can be carried out. In particular, the coaxial embodiment of these two bearing axes is of advantage here, i.e. when the two bearing axes coincide to form a common bearing axis for the first bearing device and the second bearing device. This leads to a particularly simple and straightforward possibility of movement in the form of relative rotation between said two components being possible. Not only the configuration, but also the installation and the entire operation of the link system, are thereby improved and simplified.

Furthermore, the introduction of force via said common bearing axis and therefore the two bearing devices from the vehicle body into the combination link and, furthermore, the transmission into the wheel carrier can be improved.

It is furthermore advantageous if, in the case of a wheel suspension according to aspects of the invention, the two bearing devices are arranged above and below a fastening intersection of the wheel carrier for fastening the rear wheel. The fastening intersection for the rear wheel is arranged here in particular about a corresponding axis of rotation of the respective rear wheel. The relative correlation between said fastening intersection and the two bearing devices refers here in particular to said axis of rotation of the rear wheel. Therefore, preferably the one bearing device is arranged above, and the other bearing device below, said axis of rotation of the rear wheel. This makes it possible to improve even further the introduction of force or the transmission of force between the wheel carrier and the combination link. A more stable support against tilting moments between the wheel carrier and the combination link is preferably thereby provided.

It can be furthermore advantageous if, in the case of a wheel suspension according to aspects of the invention, the link system has a track rod which is connectable or is connected to a steering mechanism which can produce a steering movement of the wheel carrier relative to the vehicle body. A steering mechanism can have both a motorized drive or else also an intersection for introducing a steering force. The steering mechanism here can be a simple mechanism or a multiplying mechanism. Of course, the steering mechanism can also have deflecting mechanism means in order to be able to produce different steering movements in different directions. By means of the provision of the steering mechanism, it now becomes possible to apply a steering force via the track rod into the steering system and therefore onto the wheel carrier. It therefore becomes possible to provide improved steering functionality for the entire vehicle since the rear axle can now also be formed as a steered rear axle with the aid of the steering mechanism. By means of the introduction of the steering force via the track rod into the steering system and therefore into the wheel carrier, the wheel carrier can be brought into different adjustment positions relative to the vehicle body, and therefore a steering movement for the rear wheel relative to the vehicle body can be ensured.

In the case of a wheel suspension according to the previous paragraph, it is advantageous if the track rod is shorter than the at least two links of the link system, wherein the steering mechanism is arranged between the at least two links. The corresponding force from the spring mounting or damping of the wheel carrier is in particular transmitted exclusively or substantially exclusively via the links of the link system. The track rod is preferably free from force or substantially free from force in respect of the damping forces and the spring mounting forces. The track rod is therefore preferably configured with regard to the pure or substantially pure transmission of steering forces from the steering mechanism to the wheel carrier. Owing to the fact that the steering mechanism can now be arranged between the other links, it also does not have an effect on the depth in the axial direction with respect to the rear wheel arranged on the wheel carrier. In other words, the wheel suspension can now be provided as a steered wheel suspension without the overall dimension of the wheel suspension changing. With the same geometrical construction size, an additional function now becomes possible with the aid of the steering mechanism in the form of a steered rear axle for the wheel suspension.

It is furthermore advantageous if, in the case of a wheel suspension according to aspects of the invention, the two link portions of the combination link are at an acute link angle with each other. In a top view, the two link portions with respect to each other can provide said link angle. A link angle in an acute embodiment leads to a further improvement in the stability. Care should be taken here to ensure that, in particular in the embodiment in the form of a cast component, corresponding transition slopes or profile shapes are provided in order to avoid or to at least to reduce unnecessary high stress concentrations. An acute steering angle, the two limbs of which are preferably likewise located at acute angles on the same side of the axis of rotation of the wheel carrier, leads to a further improvement in the compactness of the wheel suspension since in particular the depth of the wheel suspension is reduced, as seen in the direction of the axis of rotation of the rear wheel fastened to the wheel carrier.

It is furthermore advantageous if, in the case of a wheel suspension according to aspects of the invention, the basic body forms the two link portions as an integral component, in particular in a monolithic manner. For example, the combination link and the basic body thereof can be formed as a cast component. The integral or monolithic construction presents a significant reduction in the outlay of the manufacturing method. The complexity during the installation is also reduced since further installation of an additional link component can be omitted.

It is likewise advantageous if, in the case of a wheel suspension according to aspects of the invention, the combination link with its link portions provides at least two of the following links:
  spring link
  control blade
  coupling link The enumeration above is not a definitive list. Within the context of the present invention, a second or a third link can, of course, also be designed as a combination link, in the case of link systems of greater complexity, and therefore two or more combination links can also be provided in a common link system. The basic concept and the correspondingly described advantages of a wheel suspension according to aspects of the invention are already obtained if at least two links are combined in a common combination link by means of the two link portions.

The subject matter of the present invention is also a rear axle of a vehicle, having two wheel suspensions according to aspects of the invention. A rear axle according to aspects of the invention therefore affords the same advantages as have been explained in detail with respect to a wheel suspension according to aspects of the invention.

BRIEF DESCRIPTION OF THE DRAWINGS

Further advantages, features and details of the invention will become apparent from the description below, in which exemplary embodiments of the invention are described in detail with reference to the drawings. Here, the features mentioned in the claims and the description may each be essential to the invention individually or in any combination. In the schematic drawing:

DETAILED DESCRIPTION OF THE INVENTION

Figure 1:
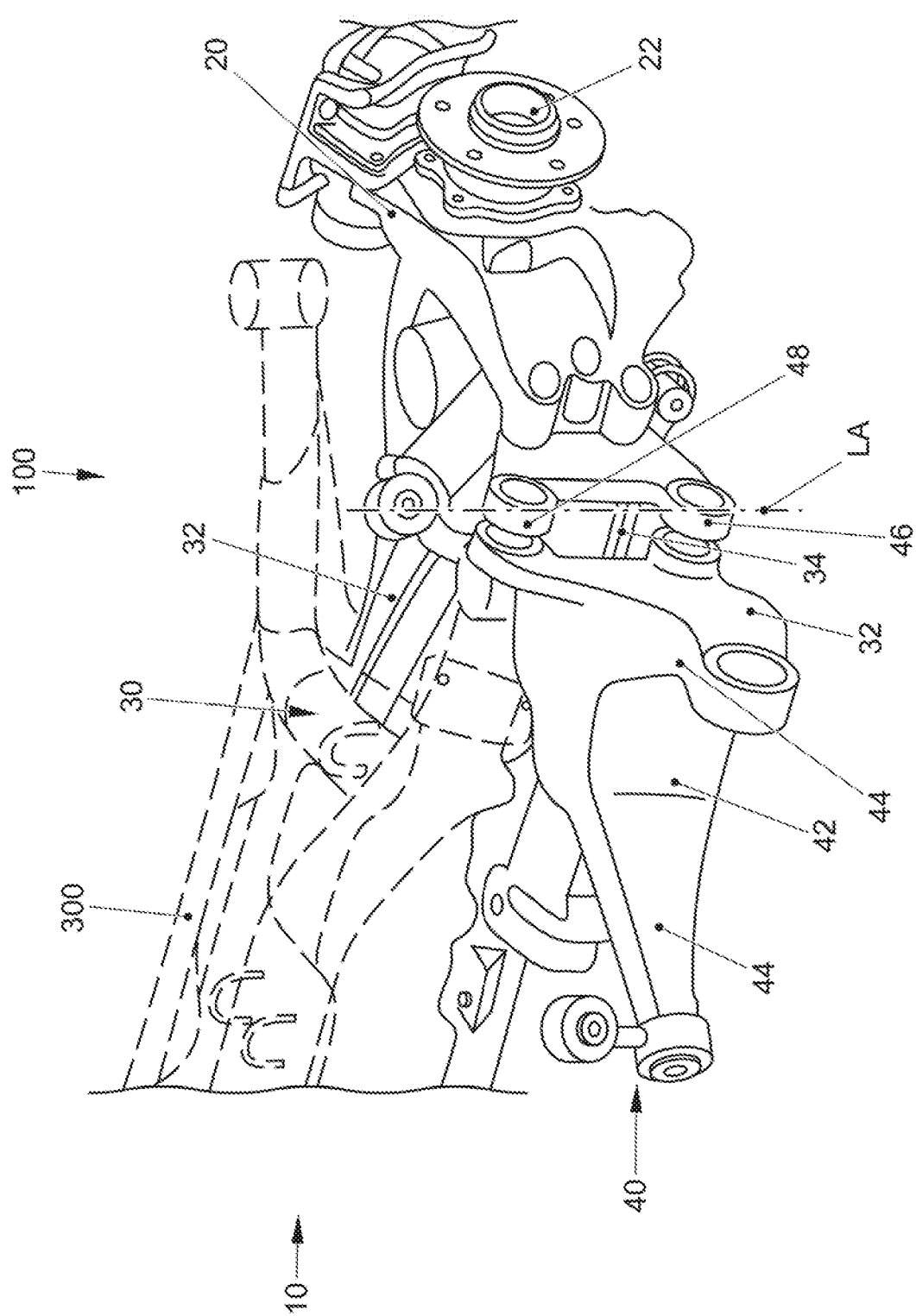
FIG. 1 shows an embodiment of a wheel suspension according to aspects of the invention.

FIGS. 1 to 6 show a first embodiment of a wheel suspension 10 according to the present invention. Said wheel suspension 10 is provided with a wheel carrier 20 which has a fastening intersection 22 for a rear wheel of a rear axle 100 of a vehicle. Said rear axle 100 can have in particular two of said wheel suspensions 10 which are arranged on both sides of a vehicle and therefore provide the entire rear axle 100 of said vehicle.

In order to be able to ensure connection of the wheel carrier 20 to a body 300 of the vehicle bodywork, a complex link system 30 is provided here. The link system 30 can be divided here essentially into three basic components. Firstly, there is a first link 32 which is expanded in the shape of a cup and is provided as the lower link 32. Furthermore, a track rod 34 can be seen, with the aid of which the steering movement (further explained later on) can be introduced into the wheel carrier 20. Finally and as the core concept of the present invention, the final link 32 provided is a combination link 40 which here in the form of a V, in particular in top view in FIG. 2, has a correspondingly acute link angel α. The combination link 40 is configured with a basic body 42, here from cast material, which has two separate link portions 44. The two link portions 44 are separate from each other and (not illustrated specifically) are likewise fastened to the vehicle body 300 and mounted there.

Figure 3:
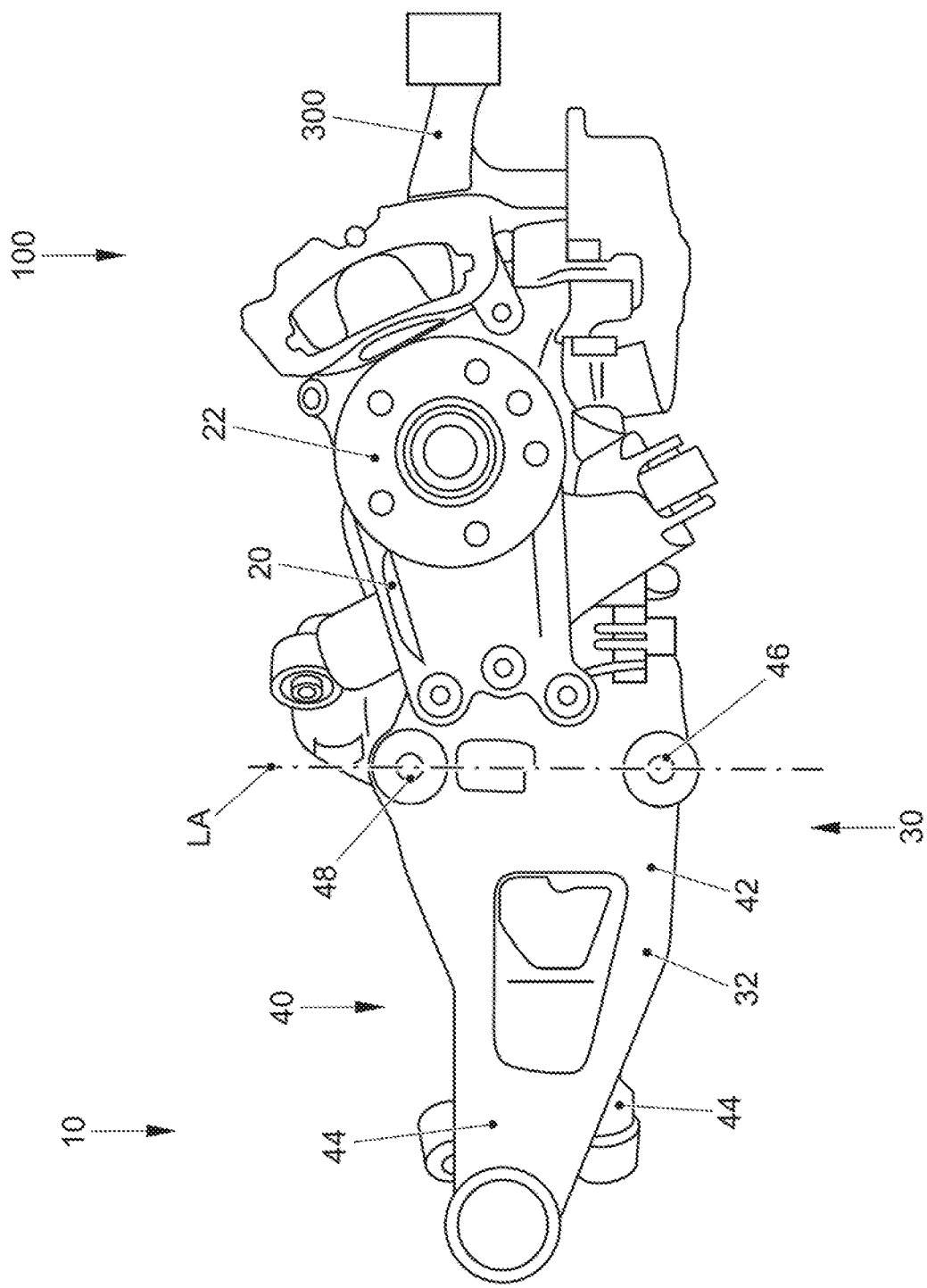
FIG. 3 shows the embodiment of FIG. 3 in a lateral view.
Figure 4:
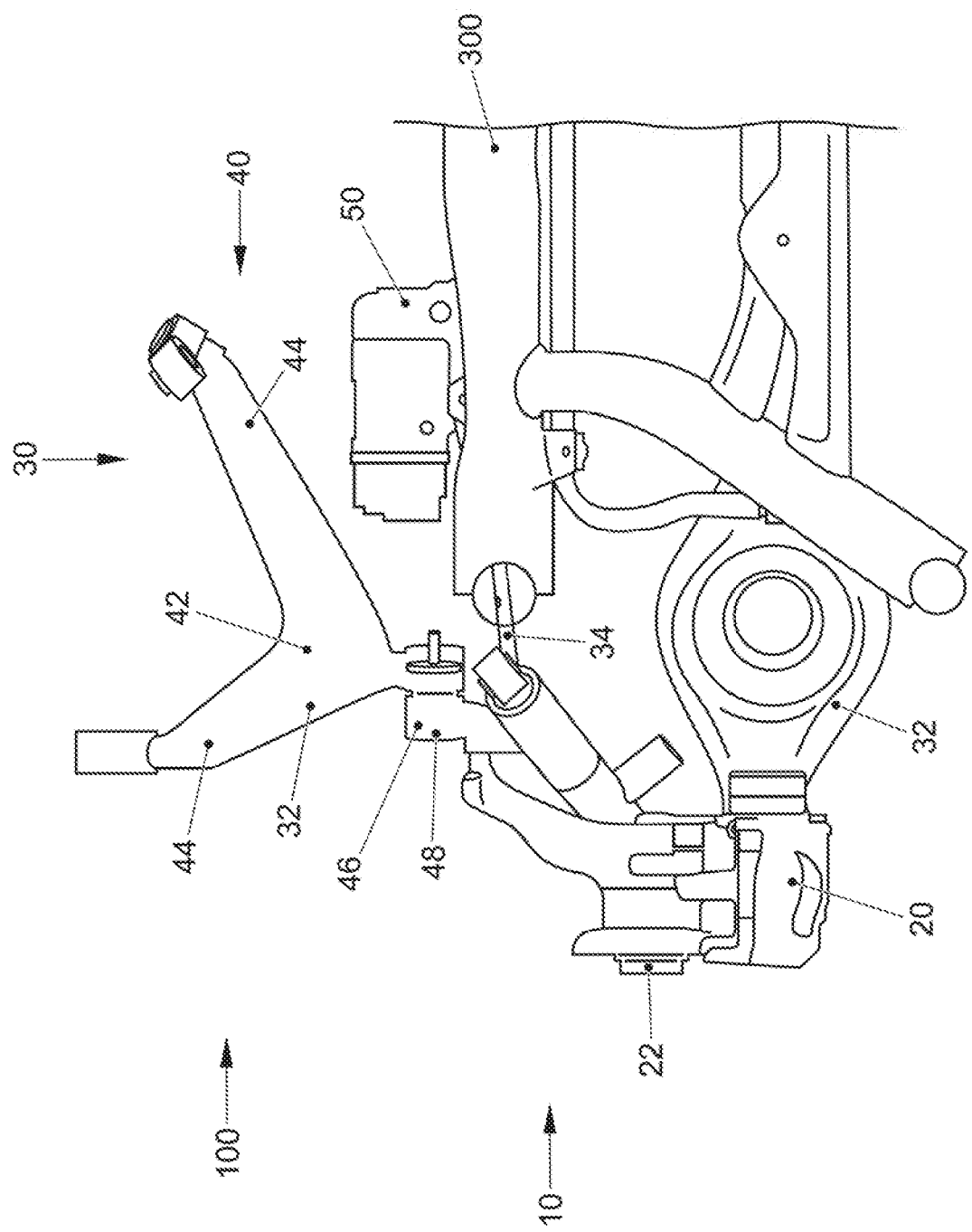
FIG. 4 shows the embodiment of FIGS. 1 to 3 in a top view.

As can be readily seen in particular in FIGS. 1 and 3, the connection between the combination link 40 and the wheel carrier 20 is divided between a first bearing device 46 and a second bearing device 48. Said two bearing devices 46 and 48 are located above and below the fastening intersection 22 of the wheel carrier 20, as, for example, FIG. 3 readily shows in lateral view. Therefore, in particular tilting moments of the wheel carrier 20 can be readily supported on the combination link 40 via said two bearing devices 46 and 48. Furthermore, the two bearing devices 46 and 48 are configured with a common bearing axis LA which is designed as a coaxial bearing axis LA. A relative rotation is therefore provided between the two components of the wheel carrier 20, on the one hand, and of the combination link 40, on the other hand.

Figure 2:
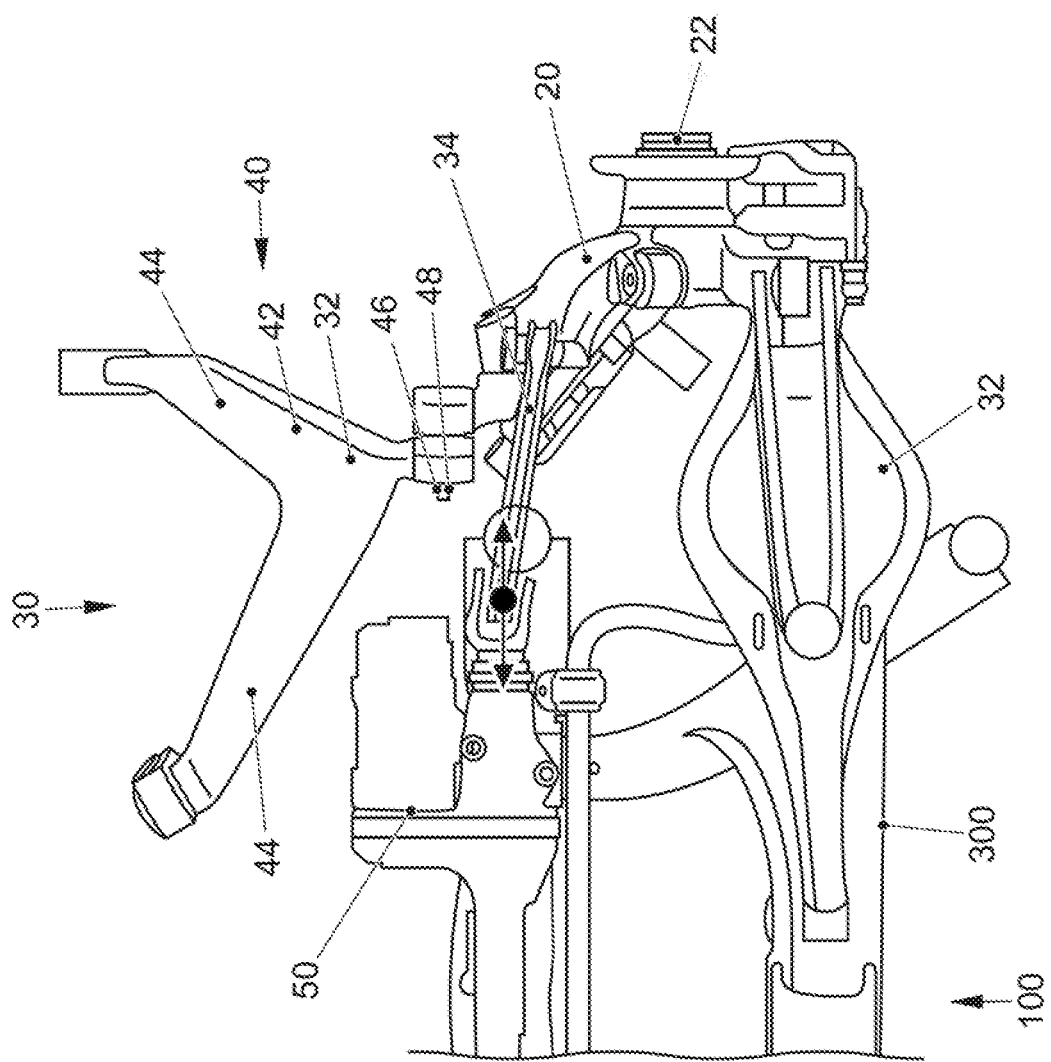
FIG. 2 shows the embodiment of FIG. 1 in a bottom view.
Figure 6:
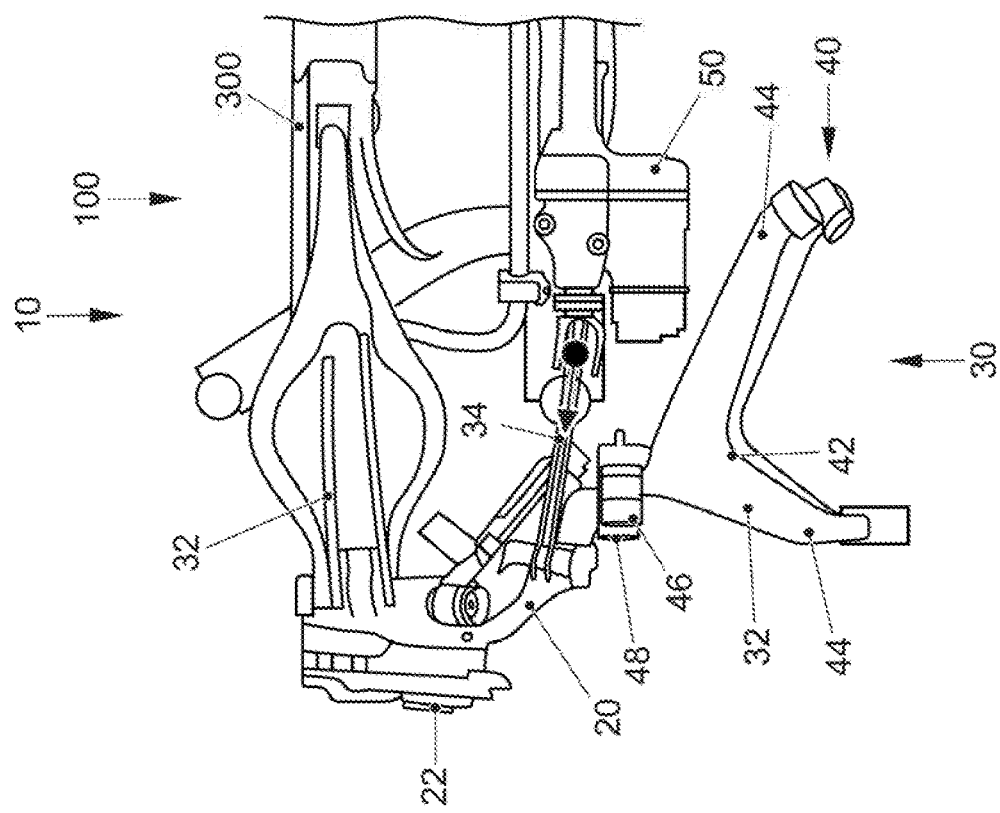
FIG. 5 shows the embodiment of FIGS. 1 to 4 in a first steering position and FIG. 6 shows the embodiment of FIGS. 1 to 5 in a second steering position.
Figure 5:
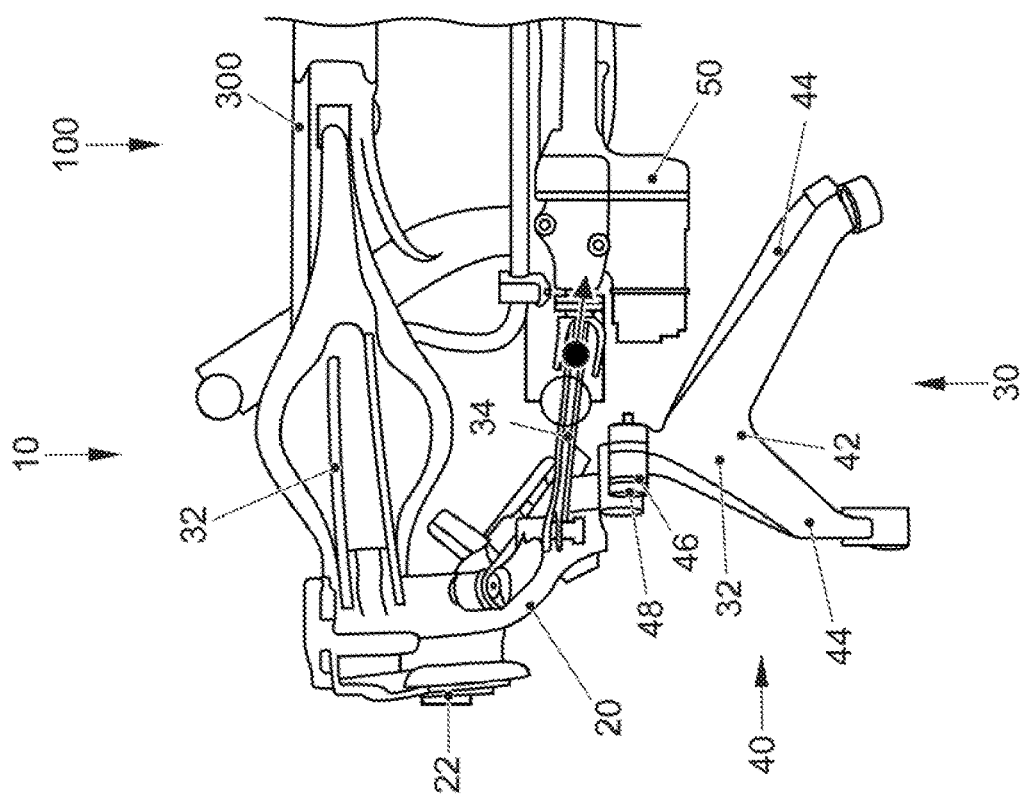

For the introduction of a steering movement, a steering mechanism 50 is provided which can readily be seen in particular in FIGS. 2, 5 and 6. The corresponding track rod 34 which is functionally coupled to the steering mechanism 50 is of shorter design than the two other links 32. It is therefore possible to arrange the track rod 34 and also the steering mechanism 50 between said two other links 32, and therefore the construction depth of the wheel suspension 10 does not change or only changes minimally, as seen in the axial direction.

FIGS. 5 and 6 now show how a steering force and therefore also a steering movement can be introduced into the wheel carrier via the track rod 34 with the aid of the steering mechanism 50. FIG. 5 therefore shows a first steering lock situation and FIG. 6 a second steering lock situation. In order to bring the wheel carrier 20 and in particular the fastening intersection 22 into the two different positions according to FIGS. 5 and 6, it is necessary here for relative movements of the individual links 32 of the link system 30 to be able to be provided. In particular, reference should be made once again here to the two bearing devices 46 and 48 and the function thereof because the latter permits the corresponding relative rotation of the combination link 40 and of the wheel carrier 20 between the two end positions of FIGS. 5 and 6.

The above explanation of the embodiments describes the present invention exclusively in the context of examples. Of course, individual features of the embodiments can be freely combined with one another, in so far as this is technically feasible, without exceeding the scope of the present invention.

What is claimed is:

1. A wheel suspension for the rear axle of a vehicle, the wheel suspension comprising:
    a wheel carrier for fastening a rear wheel,
    a link system, which comprises at least two links for fastening to a body of the vehicle, is fastened to the wheel carrier, wherein the link system has a track rod which is connectable or is connected to a steering mechanism which is configured to produce a steering movement of the wheel carrier relative to the vehicle body,
    wherein one of the at least two links is a combination link with a basic body and two link portions for fastening at two positions of the body of the vehicle, wherein the combination link is mounted on the wheel carrier via a first bearing device and via a second bearing device.

2. The wheel suspension as claimed in claim 1, wherein the first bearing device and the second bearing device have parallel and coaxial bearing axes.

3. The wheel suspension as claimed in claim 1, wherein the track rod is shorter than the at least two links of the link system, wherein the steering mechanism is arranged between the at least two links.

4. The wheel suspension as claimed in claim 1, wherein the two link portions of the combination link are at an acute link angle with each other.

5. The wheel suspension as claimed in claim 1, wherein the basic body forms the two link portions as an integral and monolithic component.

6. The wheel suspension as claimed in claim 1, wherein the combination link with the two link portions provides at least two of the following links:
- spring link,
- control blade, or
- coupling link.

7. A rear axle of a vehicle, having two wheel suspensions with the features of claim 1.

8. A wheel suspension for the rear axle of a vehicle, the wheel suspension comprising:
- a wheel carrier for fastening a rear wheel,
- a link system, which comprises at least two links for fastening to a body of the vehicle, is fastened to the wheel carrier,
- wherein one of the at least two links is a combination link with a basic body and two link portions for fastening at two positions of the body of the vehicle, wherein the combination link is mounted on the wheel carrier via a first bearing device and via a second bearing device,
- wherein the two bearing devices are arranged above and below a fastening intersection of the wheel carrier for fastening the rear wheel.

\* \* \* \* \*